(12) United States Patent
Plenderleith

(10) Patent No.: US 10,917,504 B1
(45) Date of Patent: Feb. 9, 2021

(54) IDENTIFYING THE SOURCE OF CRC ERRORS IN A COMPUTING NETWORK

(71) Applicant: Amazon Technologies, Inc., Seattle, WA (US)

(72) Inventor: Jamie Plenderleith, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 16/122,743

(22) Filed: Sep. 5, 2018

(51) Int. Cl.
| | | |
|---|---|---|
| H04L 29/08 | (2006.01) | |
| H04L 29/12 | (2006.01) | |
| H04L 1/00 | (2006.01) | |
| H04L 12/24 | (2006.01) | |
| H04L 12/26 | (2006.01) | |

(52) U.S. Cl.
CPC .......... *H04L 69/324* (2013.01); *H04L 1/0061* (2013.01); *H04L 41/0213* (2013.01); *H04L 41/06* (2013.01); *H04L 43/16* (2013.01); *H04L 61/2007* (2013.01)

(58) Field of Classification Search
CPC ..... H04L 69/324; H04L 1/0061; H04L 43/16; H04L 41/0213; H04L 41/06; H04L 61/2007
See application file for complete search history.

(56) References Cited

U.S. PATENT DOCUMENTS

| | | | | |
|---|---|---|---|---|
| 2003/0026267 A1* | 2/2003 | Oberman | ................ | H04L 47/10 370/397 |
| 2007/0286195 A1* | 12/2007 | Ilnickl | ..................... | H04L 43/00 370/392 |

* cited by examiner

*Primary Examiner* — Jackie Zuniga Abad
(74) *Attorney, Agent, or Firm* — Klarquist Sparkman, LLP

(57) ABSTRACT

Technologies are provided for identifying the source of cyclic redundancy check (CRC) errors within a computer network that uses cut-through forwarding of network packets. For example, inbound network packets can be received by a network device that is configured to perform cut-through forwarding. Once the network packets are received, they are processed using cut-through forwarding. In addition to the cut-through forwarding, at least some of the received network packets are duplicated to create duplicate network packets. The duplicate network packets are processed using a different procedure. For example, the duplicate network packets are processed (e.g., as part of a secondary processing pipeline) by performing CRC checks on the duplicate network packets to detect CRC errors. Based on the CRC checks, source devices that originated network packets with CRC errors can be identified.

17 Claims, 8 Drawing Sheets

IDENTIFYING THE SOURCE OF CRC ERRORS IN A COMPUTING NETWORK

BACKGROUND

In order to communicate network traffic between a source device and a destination device, packet forwarding networks forward packets between network devices, such as routers and switches, along the path between the source and the destination. In some computer networks, network devices implement various forwarding strategies, which can include store-and-forward and cut-through forwarding. With store-and-forward, the entire network packet is received before it is forwarded on. With cut-through forwarding, the network device does not have to wait for the entire packet to be received before beginning to forward it on to the next network device.

While cut-through forwarding can reduce the latency of network packets being transmitted through the computer network, cut-through forwarding has some drawbacks. For example, with cut-through forwarding corrupted network packets can be transmitted across a number of network devices before the problem is discovered. In addition, it may be difficult to identify the source of the network packet corruption because the network packets have already been forwarded when the network packet corruption is detected.

DETAILED DESCRIPTION

Overview

Figure 1:
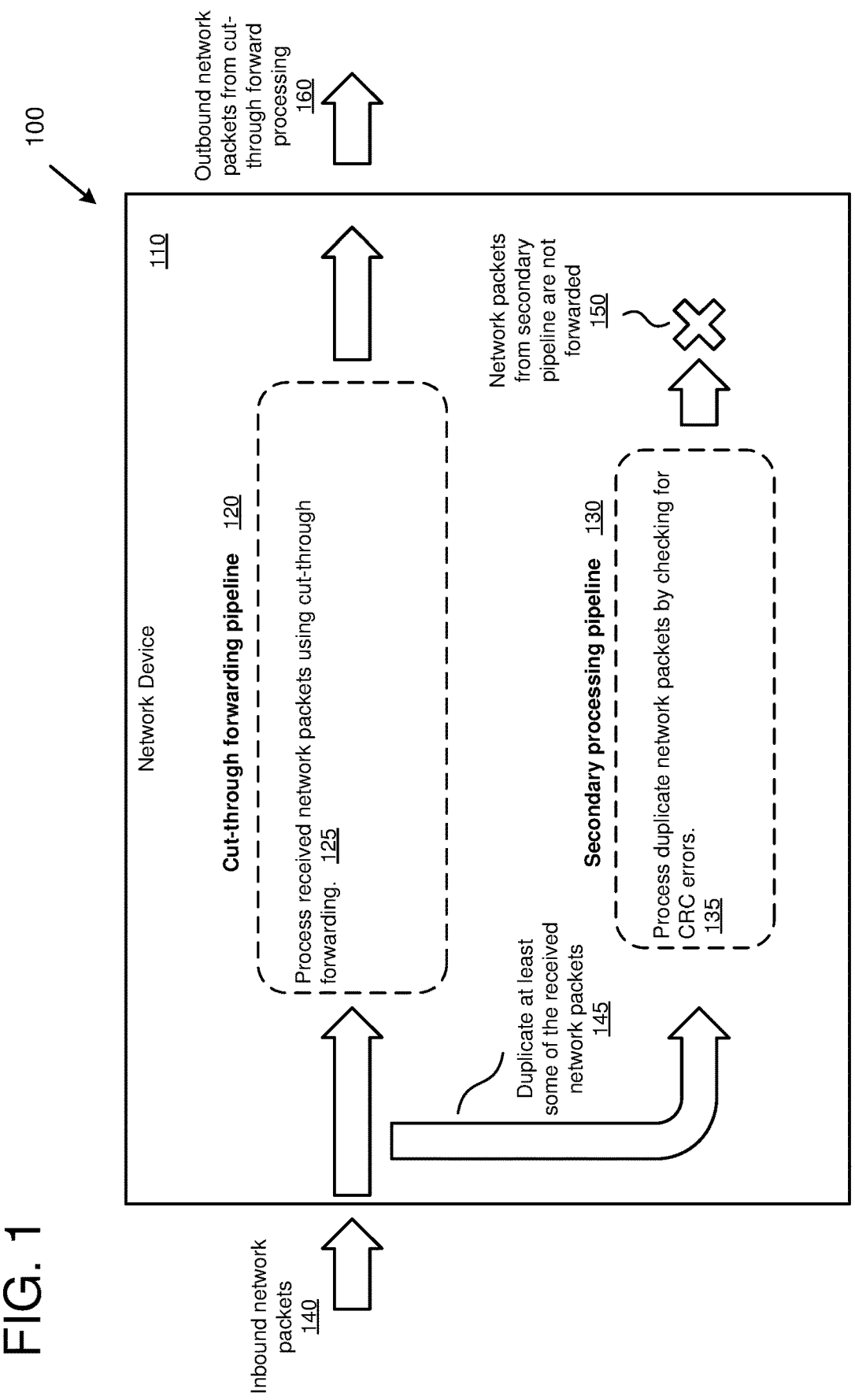
FIG. 1 is a diagram depicting an example network device for identifying the source of CRC errors within a computer network.

The following description is directed to technologies for identifying the source of cyclic redundancy check (CRC) errors within a computer network that uses cut-through forwarding of network packets. For example, inbound network packets can be received by a network device (e.g., a router or switch) that is configured to perform cut-through forwarding of the network packets it receives. Once the network packets are received by the network device, they are processed using cut-through forwarding (e.g., they are forwarded on to the next network device, or final destination, using cut-through forwarding). In addition to the cut-through forwarding, at least some of the received network packets are duplicated to create duplicate network packets. The duplicate network packets are processed using a different procedure (e.g., by a different processing pipeline), generally simultaneously to the processing of the original packets that are being processed using cut-through forwarding. For example, the duplicate network packets are processed using one or more operations, possibly including operations that are typically associated with store-and-forward processing. For example, CRC checks can be performed on the duplicate network packets to detect CRC errors. Based on the CRC checks, source devices that originated network packets having CRC errors can be identified. Results of the CRC checks can then be output. For example, the identities (e.g., source Internet Protocol (IP) addresses) of the source devices that originated network packets with CRC errors can be output (e.g., provided to a logging system, sent via an alert, etc.).

The technologies described herein are implemented within the context of a computer network in which some or all of the network devices are using cut-through forwarding. Network devices generally use two types of forwarding strategies for network packets (also sometimes called "frames" herein), store-and-forward and cut-through forwarding. With store-and-forward network packet processing, the entire network packet is received before it is forwarded on to the next hop or destination computing device. With cut-through forwarding, the network packet is forwarded as it is received. Cut-through forwarding provides a reduction in latency when compared to store-and-forward because the network device does not have to wait until the entire packet has been received before forwarding it on to the next network device or destination computing device. For example, a network device receiving a network packet can examine the packet header and being forwarding the network packet to the next hop along the path to the ultimate destination as the network packet is being received (before the whole network packet has been received by the network device). Other network devices along the path can do the same thing.

With store-and-forward processing, detecting CRC errors can be straightforward because the network packets are received and their CRC values are evaluated before the network packets are forwarded on. If a given network packet fails its CRC check, then that network packet can be discarded and not forwarded. With cut-through forwarding, however, the network device will not know if there is an error with the packet until the entire packet has been received because the CRC field is located at or near the end of the packet (after the packet payload data). Therefore, when cut-through forwarding is being used, the network devices (e.g., five, ten, or more network devices) along the path of a network packet with a CRC error will each experience a CRC error with that network packet. As a result, networks using cut-through forwarding will generate more CRC errors because network packets with CRC errors can be propagated across many devices of the network. In addition, it can be difficult to isolate the source of the CRC errors in a cut-through network. For example, a network device that is processing network packets using cut-through forwarding will not detect CRC errors until the end of the packet is reached, at which point the entire packet will no longer be available at the network device (e.g., the network device will not have the network packet header to check for the source IP address).

In a computer network, a CRC error is identified using a CRC value stored in a CRC field (called the frame check sequence field) in an Ethernet frame portion of a network packet. A CRC error indicates that some data within the network packet is corrupted. Corruption of network packet data can be caused by, for example, a failing network interface of a server or network device, a network cable problem (e.g., a loose optical or electrical connection), or an environmental factor (e.g., vibration or heat). In some implementations, other types of network packet errors (also called packet errors) can be monitored and used (e.g., separately or in combination with CRC errors) for identifying source devices that originated such errors. For example, forward error correction errors, framing errors, and/or header checksum errors can be used.

Using the technologies described herein, at least a portion of the network packets that are received (i.e., one or more of the packets that are received) by a network device are duplicated and processed separately (e.g., separately from the standard cut-through forwarding pipeline). A typical router or switch needs to process many thousands, or even millions, of network packets every second. Therefore, depending on factors such as network traffic rate and processing resources, it may not be practical (or even possible) to duplicate every network packet that a network device receives. Therefore, only some of the inbound network packets are duplicated. The number of inbound network packets that are duplicated, also called the sampling rate or duplication rate, can be selected based on a number of criteria such as the network traffic rate and/or available processing resources of the network device. In some implementations, every $N^{th}$ inbound network packet at each network port is duplicated (e.g., the value of N can vary based on current network traffic throughput and available computing resources). Other types of sampling can be used as well, such as selecting inbound network packets for duplication at a rate based on a random distribution. While sampling will typically be needed, in some situations it may be possible to duplicate all inbound network packets (e.g., where sufficient computing resources are available for the current network throughput).

The sampling rate can also be selected so that other network processing operations are not affected by the duplication and additional processing of the duplicated network packets. For example, available computing resources of the network device (e.g., available CPU or other processor resources) that would otherwise be idle can be utilized to perform the duplication and additional processing (e.g., checking for CRC errors, identifying source devices, and outputting results).

The duplicate network packets are processed using a secondary processing pipeline that is separate from the cut-through forwarding pipeline used to process the original network packets. The secondary processing pipeline performs, at least in part, CRC checks on the duplicate network packets. For example, the CRC checks on the duplicate network packets can be the same type of CRC checks that would be carried out if store-and-forward processing were being performed on the duplicate network packets. The secondary processing pipeline is also different from the cut-through forwarding pipeline because the secondary processing pipeline can maintain the network packet headers (e.g., similar to how store-and-forward processing operates). Because the duplicate network packets are processed in this way, at least the packet headers (and in some implementations the entire packet) are available for identifying the source of the packet. For example, if a duplicate network packet is processed and found to have a CRC error, the network packet can be examined to determine the identity of the source device that sent (originated) the network packet (e.g., the source device can be identified using the IP address of the source device in the network packet header). Additional information can also be obtained about the duplicate network packets, such as destination IP address, source and destination port numbers, network protocol information, etc.

Using the technologies described herein to identify the source of CRC errors can provide benefits in terms of network performance and computing resource utilization. For example, if network packets with CRC errors are re-transmitted by a number of network devices using cut-through forwarding, then the number of network devices will each have to spend computing resources processing the network packets and utilize network bandwidth for each re-transmission. Using the technologies described herein, a computing device that is transmitting network packets with CRC errors can be identified and the problem can be contained or resolved. For example, a network link or network port issue can be identified and fixed. As another example, subsequent network packets sent from a computing device that is originating CRC errors can be blocked (e.g., dropped) by network devices. As a result, the network devices do not have to expend computing resources processing such network packets and network bandwidth is available for other traffic (e.g., thus reducing congestion and improving performance).

FIG. 1 is a diagram 100 depicting an example network device 110 that processes duplicate network packets using a secondary processing pipeline 130. The network device 110 can be a switch, a router, or another type of network device that processes network packets. As depicted at 140, the network device 110 receives inbound network packets. The inbound network packets are received via network ports of the network device 110. The inbound network packets can be received from other network devices (e.g., from other routers or switches) or from computing devices (e.g., servers, desktop computers, laptop computers, etc.).

The network device 110 processes the received network packets (the inbound network packets depicted at 140) using a cut-through forwarding pipeline 120 (e.g., primary processing pipeline). The cut-through forwarding pipeline 120 processes the received network packets using cut-through forwarding, as depicted at 125. After the received network packets that are processed by the cut-through forwarding pipeline 120, they are forwarded on to their respective destinations, as depicted at 160. The cut-through forwarding pipeline 120 processes a received network packet and forwards it on (e.g., to a next-hop network device or a destination computing device) without waiting for the entire network packet to be received.

In addition to the inbound network packets being processed using cut-through forwarding, at least some of the inbound network packets are duplicated, as depicted at 145. The duplicated network packets are then processed using a secondary processing pipeline 130. The secondary processing pipeline 130 processes the duplicate network packets, including checking the duplicate network packets for CRC errors, as depicted at 135. In some implementations, the secondary processing pipeline 130 uses store-and-forward processing (e.g., at least one store-and-forward processing operation), which includes checking for CRC errors. In some implementations, the only store-and-forward processing operation performed by the secondary processing pipeline 130 is checking for CRC errors. For example, the other store-and-forward processing operations can be skipped (e.g., because the duplicate network packet does not need to be forwarded on). In some implementations, the secondary processing pipeline 130 is a partial store-and-forward processing pipeline that performs at least the CRC checking.

Results of the processing performed on the duplicate network packets by the secondary processing pipeline 130 can be output. For example, identities of source devices that sent duplicate network packets with CRC errors can be determined and reported (e.g., provided to a logging system or sent via an alert).

The duplicate network packets that are processed using the secondary processing pipeline 130 are not forwarded on by the network device 110, as depicted at 150. Forwarding of the duplicate network packets is typically not needed because the original received network packets are forwarded on after being processed by the cut-through forwarding pipeline 120 (as depicted at 160).

In some implementations, the received network packets that are processed using cut-through forwarding are processed by a first hardware and/or software component of the network device and the duplicate network packets that are processed by performing CRC checks are processed by a second hardware and/or software component of the network device. In some implementations, one or more application specific integrated circuits (ASICs) process the received network packets using cut-through forwarding (e.g., implement a cut-through forwarding pipeline), duplicate at least some of the received network packets, and process the duplicate network packets by performing CRC checks (e.g., implement a secondary processing pipeline). For example, with reference to network device 110, one or more ASICs can implement the cut-through forwarding pipeline 120 and the secondary processing pipeline 130. One or more central processing units (CPUs) can identify source devices sending network packets with CRC errors and/or output results of the CRC checks.

In some implementations, one or more ASICs process the received network packets using cut-through forwarding (e.g., implement a cut-through forwarding pipeline), and one or more CPUs process the duplicate network packets by performing CRC checks (e.g., implement a secondary processing pipeline). For example, with reference to network device 110, one or more ASICs can implement the cut-through forwarding pipeline 120, and one or more CPUs can implement the secondary processing pipeline 130. The one or more central processing units (CPUs) can also identify source devices sending network packets with CRC errors and/or output results of the CRC checks. In some implementations, duplication of the received network packets is performed by the one or more ASICs.

Figure 2:
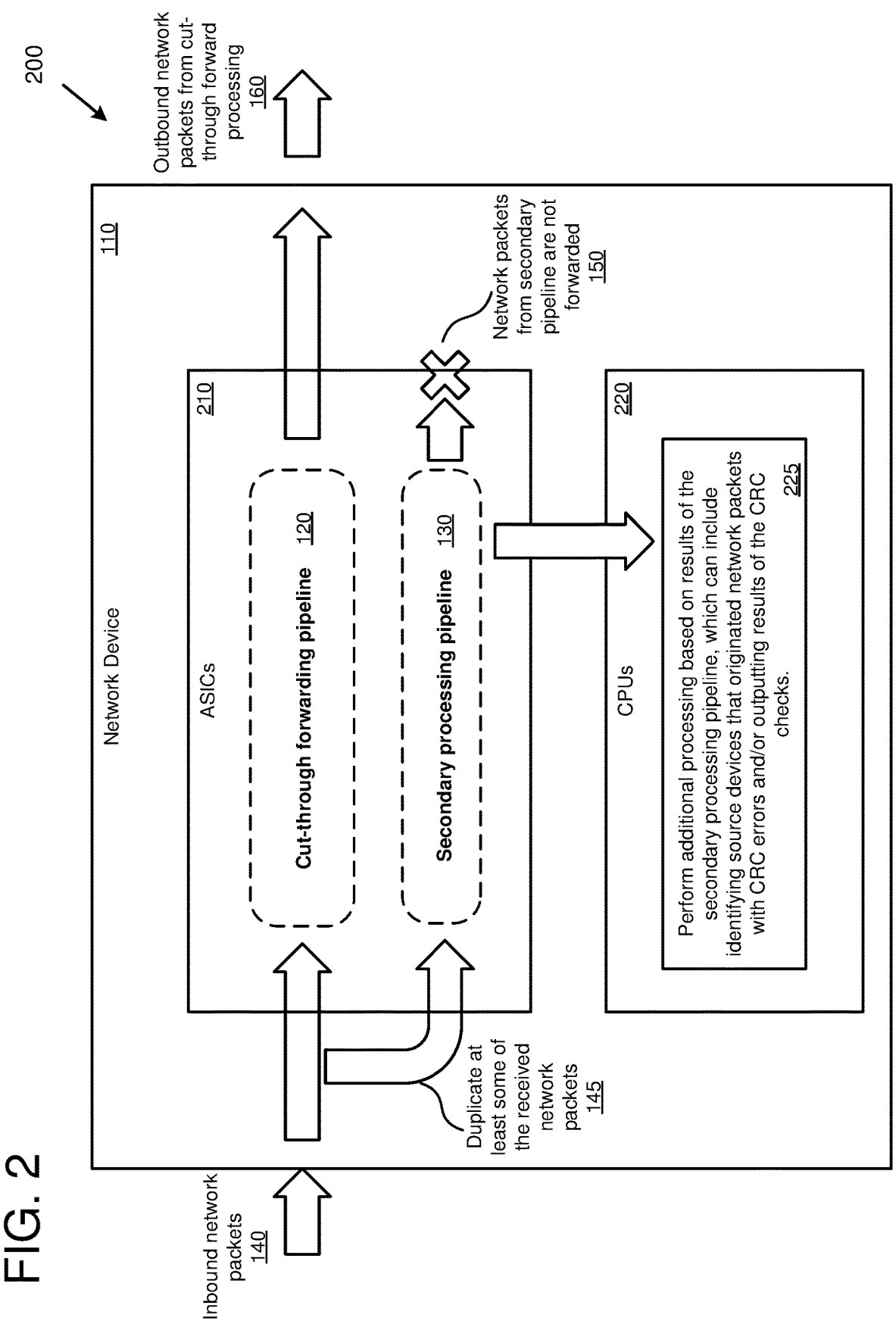
FIG. 2 is a diagram depicting an example network device with one or more ASICs and one or more CPUs for identifying the source of CRC errors within a computer network.

FIG. 2 is a diagram 200 depicting an example implementation of the network device 110 that includes one or more ASICs 210 and one or more CPUs 220. As depicted in the diagram 200, the one or more ASICs 210 operate the cut-through forwarding pipeline 120 and the secondary processing pipeline 130. For example, a single ASIC could operate both the cut-through forwarding pipeline 120 and the secondary processing pipeline 130. Alternatively, multiple ASICs could implement the pipelines. For example, one ASIC could implement the cut-through forwarding pipeline 120 and a second ASIC could implement the secondary processing pipeline 130. Regarding the secondary processing pipeline 130, the ASIC (or ASICs) could perform operations to duplicate network packets and process the duplicate network packets by checking for CRC errors (e.g., as depicted at 135). The secondary processing pipeline 130 comprises circuit blocks configured to perform these functions. FIG. 2 depicts duplication of the packets 145 as occurring outside of the ASIC 210. This could be handled by a duplication circuit (not shown) separate from the ASIC 210. In further embodiments, the duplication of the packets 145 is handled by a duplication circuit block (not shown) inside the ASIC 210. The duplication circuit block copies packets that are going into the cut-through forwarding pipeline 120 and sends them to the secondary processing pipeline 130.

As depicted in the diagram 200, the one or more CPUs 220 perform additional processing (e.g., control plane processing operations). For example, as depicted at 225 the one or more CPUs can perform additional processing based on results of the secondary processing pipeline 130. The additional operations performed by the one or more CPUs 220 can include identifying source devices that originated network packets with CRC errors. For example, the ASICs 210 can send results of processing the duplicate network packets by the secondary processing pipeline 130 to the one or more CPUs 220 (e.g., network packet header information for duplicate network packets with CRC errors). The one or more CPUs 220 can then identify source devices that originated network packets with CRC errors (e.g., based on source IP address). The additional operations performed by the one or more CPUs 220 can also include outputting results of the CRC checks (e.g., based on results of the secondary processing pipeline 130 provided by the one or more ASICs 210). For example, the one or more CPUs 220 can send alerts, save information to log files, communicate with external systems (e.g., with a monitoring service), and/or take other action based on the results of the CRC checks.

In some implementation, the duplicate network packets are checked for CRC errors using a separate control plane of the network device. For example, a separate control plane can be used to process the duplicate network packets so that the normal control plane is not affected (e.g., the processing rate of the separate control plane can be adjusted so that processing performed by the normal control plane is not slowed down).

The number of incoming network packets that are duplicated (and checked for CRC errors) for each network port of a network device can be adjusted (e.g., the sampling rate can be increased or decreased) on the ports overall and/or on a port-by-port basis depending on a variety of criteria. For example, if CRC errors are detected on one or more specific network ports of the network device, then the rate of duplication can be increased on those specific network ports, and the rate of duplication can remain the same, or be decreased, on the other network ports of the network device. In other words, the proportion of inbound network packets from the specific network ports that are duplicated can be increased. Increasing the rate of duplication on network ports that are receiving network packets with CRC errors can improve the network device's ability to detect CRC errors (by examining more incoming network packets) and identify the sources of the CRC errors.

The rate of duplication can also be adjusted based on network error counts of the network device. For example, input error counters (e.g., counters such as ifInErrors, which tracks network interface input errors including CRC errors) can be used. If a specific network port (or network ports) are experiencing increased network errors, then the duplication rate for those ports can be increased (e.g., in proportion to other network ports).

In some implementations, rates of duplication can be adjusted based on whether a network device is part of a mesh network (e.g., a full mesh) and/or based on whether a network device is using equal-cost multi-path routing (ECMP). For example, if a network device is part of a mesh network, rates of duplication can be set equally among the network ports (e.g., adjusting rates on a port-by-port basis can be disabled).

In some implementations, network packets from specific source devices are excluded from duplication. For example, if a specific source device (e.g., based on source IP address) is sending network packets with CRC errors that exceed an error threshold (e.g., a threshold rate of more than one network packet with a CRC error per second), then subsequent network packets from the specific source device can be excluded from duplication (and therefore not processed using the secondary processing pipeline). The exclusion can last for a period of time (e.g., a number of seconds or minutes). Excluding such incoming network packets from duplication can free up resources to check incoming network packets from other source devices. For example, because the specific source device has already been identified as a source of CRC errors, it may not be useful to check its network packets, at least for a period of time.

In some implementations, network packets from specific source devices are blocked based upon CRC check results. For example, if a specific source device (e.g., based on source IP address) is sending network packets with CRC errors that exceed an error threshold (e.g., a threshold rate where a high percentage of network packets have CRC errors), then subsequent network packets from the specific source device can be blocked by the network device (e.g., dropped by the data plane). Blocked network packets would not be processed at all by the network device (not by the cut-through forwarding pipeline and not by the secondary processing pipeline), and therefore would not be forwarded on by the network device. In some implementations, blocking is performed using a source-based routing rule or a firewall rule. The block can last for a period of time (e.g., a number of seconds or minutes). Blocking such incoming network packets can free up resources on the network device and prevent errors from propagating to other network devices. In some implementations, network packet processing can be blocked for an entire network port (or ports). For example, if a high percentage of network packets being received on a network port have CRC errors, the entire network port can be shut down, at least for a period of time (e.g., until the problem is resolved). In some implementations, network packets with CRC errors can also be blocked based on destination IP address in addition to, or instead of, blocking based on source IP address.

Results of processing the duplicate network packets by the secondary processing pipeline can be output. For example, the network device can send an alert indicating results of the CRC checks. The results can include identities of source devices that originated network packets with CRC errors (e.g., source device IP addresses, destination IP addresses, and/or other identifying information). The alert could be in the form of an email, an instant message, a simple network management protocol (SNMP) trap, or another type of alert.

Results can be output in other ways instead of, or in addition to, alerts. For example, results can be saved in local and/or remote logs (e.g., saved to a local log file or database, provided to a local or remote logging system, etc.). In some implementations, results are output as syslog messages to a local log or to a remote logging service. Another way in which results can be saved or reported is using SNMP objects indicating the results of the CRC checks. For example, new SMNP metrics can be recorded with object identifiers (OIDs) derived from the source and/or destination IP addresses.

Figure 3:
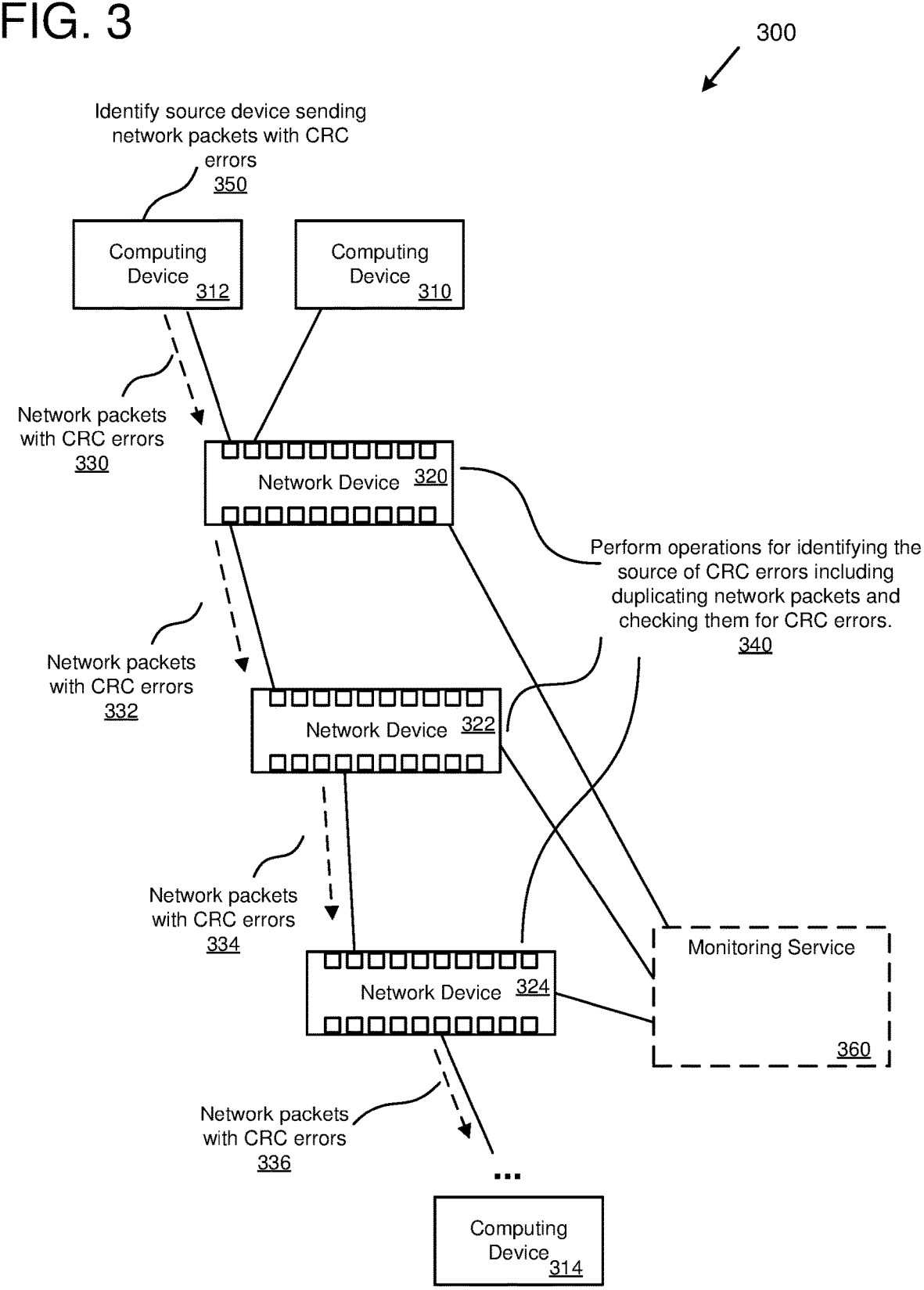
FIG. 3 is a diagram depicting an example computer network comprising network devices that perform operations for identifying the source of CRC errors.

FIG. 3 is a diagram 300 depicting an example of identifying the source of CRC errors within a computer network. The diagram 300 is a simplified diagram that only depicts a few devices and network connections for ease of illustration. A real-world computing environment would typically contain many more computing devices, network devices, network connections and network fabrics, and other computing resources.

In the diagram 300, three example computing devices 310, 312, and 314 are depicted. For example, the computing devices 310, 312, and 314 can be server computers (e.g., running virtual machine instances) or other types of computing devices (e.g., desktop or laptop computers). Three example network devices 320, 322, and 324 are also depicted. For example, the network devices 320, 322, and 324 can be switches, routers, or other types of networking equipment that process network packets. The network devices 320, 322, and 324 can be part of a larger network of a business or organization (e.g., part of a data center network that can comprise network fabrics, such as multi-tiered network fabrics). The network devices 320, 322, and 324 each have a number of network ports for connecting to computing devices or other network devices. In the diagram 300 a number of example network links are depicted. Specifically, computing devices 310 and 312 are connected to network device 320. For example, computing devices 310 and 312 may have network interfaces (e.g., gigabit Ethernet network interfaces) connected to wired Ethernet cables (or using another physical network technology, such as token ring) that connects to network ports of network device 320. Network device 320 is connected to network device 322. Network device 322 is connected to network device 324. Network device 324 is ultimately connected (by some intermediary networking devices such as one or more switches or routers, which are not depicted) to computing device 314.

The diagram 300 depicts an example flow of network packets (e.g., Internet Protocol (IP) network packets operating over Ethernet) from computing device 312 (which is the source of the network packets in this example) to computing device 314 (which is the destination of the network packets in this example). The computing device 312 sends the network packets over the network link that is connected to a first network port of network device 320 (the network port of network device 320 that is connected to computing device 312 is called a "first" network port for ease of identification in this example). In order for the network packets to reach the destination computing device 314, the network device 320 transmits the network packets via a second network port of network device 320, which is connected to a first network port of network device 322. Network device 322, in turn, transmits the network packets via a second network port to a first network port of network device 324. The network packets are received and transmitted in this way until they are received at the destination computing device 314.

In the diagram 300, network devices 320, 322, and 324 process network packets using cut-through forwarding (e.g., cut-through forwarding is enabled on all network ports of network devices 320, 322, and 324). Therefore, network device 320 will begin transmitting a network packet it receives from computing device 312 to network device 322 before the complete network packet has been received by network device 320. Network device 322 will do the same thing, as will network device 324.

In the diagram 300, the network packets being transmitted from computing device 312 to computing device 314 are experiencing CRC errors, as depicted at 330. For example, the network cable connecting computing device 312 to network device 320 may have a problem, which is introducing corruption in the packet data. Network device 320 will record the CRC errors, but not until network device 320 has completed reception of a given network packet and checked its CRC value, at which time the given network packet will have already traversed network devices 322 and 324 causing CRC errors at those network devices as well (as depicted at 332, 334, and 336, the network packets being transmitted will also have CRC errors). While the diagram 300 depicts the source of the CRC errors as the computing device 312, or the link between the computing device 312 and the network device 320, in general CRC errors can be introduced by computing devices, network devices, or network links. For example, network device 320 or 322, or the link between them, could be the source of CRC errors in a different scenario.

As depicted at 340, the network devices 320, 322, and 324 perform operations for identifying the source of CRC errors, including duplicating network packets and checking them for CRC errors. For example, network device 320 can receive inbound network packets from its network ports (including inbound network packets from computing devices 310 and 312), duplicate at least some of the received network packets, and process the duplicate network packets including performing CRC checks on the duplicate network packets. The network device 320 can output results of the CRC checks, which can include determining and reporting on the identities of source devices that are sending network packets with CRC errors. For example, network device 320 can duplicate, and perform CRC checks on, at least some of the network packets received from computing device 312. Upon determining that duplicate network packets with CRC are originating from computing device 312 (e.g., identified by the source IP address in the packet headers), the network device 320 can report that computing device 312 is sending network packets with CRC errors. Other network devices (e.g., network device 322 and 324) can similarly duplicate inbound network packets and process the duplicate network packets to detect CRC errors and identify the source devices that are sending network packets with CRC errors.

In some implementations, a monitoring service 360 is present in the computer network. The monitoring service 360 can perform tasks that support the network devices (e.g., network devices 320, 322, and 324). For example, the network devices can send results of the CRC checks (e.g., source and destination IP addresses, source and destination port numbers, protocol information, network packet header information, and/or other information) to the monitoring service 360. The monitoring service 360 can record results, provide reporting tools, and/or take action based on the results. For example, the monitoring service 360 can instruct network devices to exclude or drop network packets from source devices that are sending network packets with CRC errors.

In some implementations, a network device re-routes network packets (e.g., duplicate network packets that have been identified as having CRC errors) to another destination for analysis. For example, the network device can encapsulate a duplicate network packet with a CRC error and send it to a outside system (e.g., to the monitoring service 360). The encapsulation could be performed by the ASICs 210 (e.g., as part of the secondary processing pipeline 130) and/or by the CPUs 220. The outside service can perform additional analysis (e.g., an administrator can examine the network packets to determine the cause of the errors). For example, a certain number of duplicate network packets with CRC errors can be encapsulated and sent to an outside system (e.g., a certain percentage).

In any of the technologies described herein, methods can be provided for identifying the source of CRC errors within a computer network. For example, the network devices can duplicate network packets, check the duplicate network packets for CRC errors, and output results.

Figure 4:
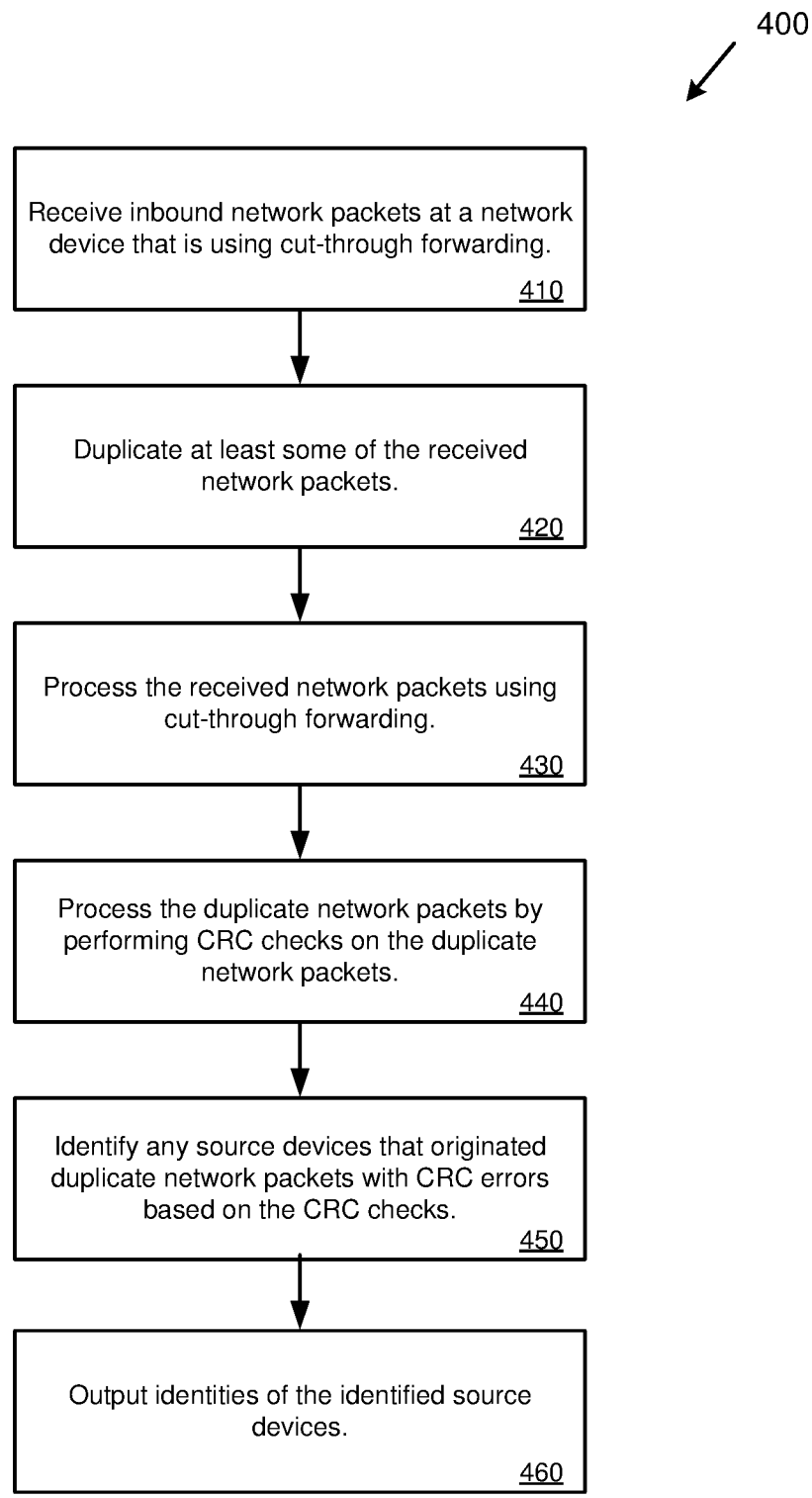
FIG. 4 is a flowchart of an example method for identifying the source of CRC errors with a computer network.

FIG. 4 is a flow chart of an example method 400 for identifying the source of CRC errors with a computer network. For example, the example method 400 can be performed by a network device (e.g., by network device 320, 322, or 324), such as a router, switch, or other type of network device that processes incoming network packets using cut-through forwarding.

At 410, inbound network packets are received at a network device that is using cut-through forwarding. At 420, at least some of the received network packets are duplicated. At 430, the received network packets are processed using cut-through forwarding.

At 440, the duplicate network packets are processed by checking them for CRC errors. In some implementations, checking the duplicate network packets for CRC errors is performed as a store-and-forward processing operation. In some implementations, the duplicate network packets are not forwarded on to their respective destinations. For example, after the network device performs the CRC checks, and outputs any results, the duplicate network packets can be discarded without forwarding them to the next-hop network device or final destination.

At 450, any source devices that originated duplicate network packets with CRC errors are identified based on the CRC checks. For example, the source devices can be identified by their source IP addresses.

At 460, the identities of the identified source devices are output. For example, the identities can be provided in the form of alerts or log messages.

Figure 5:
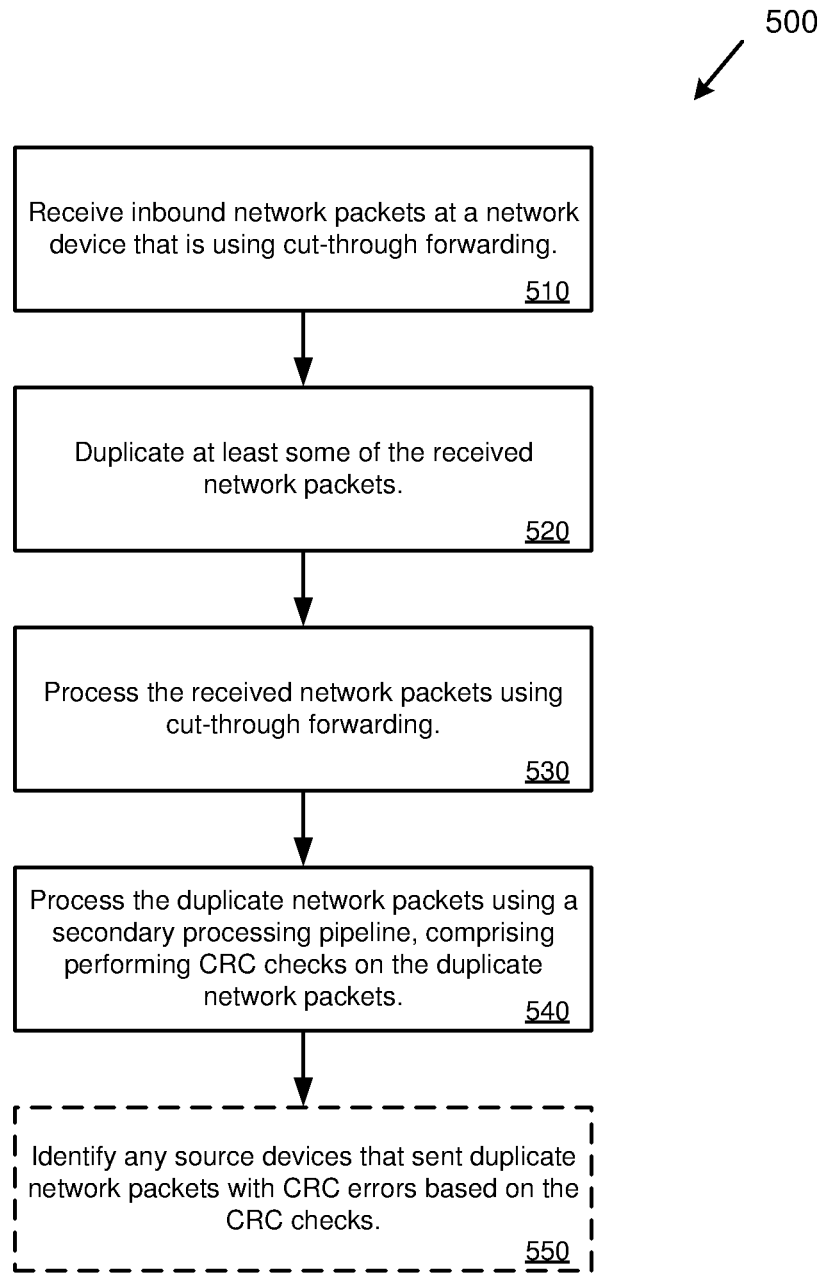
FIG. 5 is a flowchart of an example method for identifying the source of CRC errors with a computer network using a secondary processing pipeline.

FIG. 5 is a flow chart of an example method 500 for identifying the source of CRC errors with a computer network using a secondary processing pipeline. For example, the example method 500 can be performed by a network device (e.g., by network device 320, 322, or 324), such as a router, switch, or other type of network device that processes incoming network packets using cut-through forwarding.

At 510, inbound network packets are received at a network device that is using cut-through forwarding. At 520, at least some of the received network packets are duplicated. At 530, the received network packets are processed using cut-through forwarding.

At 540, the duplicate network packets are processed using a secondary processing pipeline, comprising performing CRC checks on the duplicate network packets to detect CRC errors (e.g., as a partial store-and-forward processing pipeline). In some implementations, the secondary processing pipeline performs only the CRC checks. In some implementations, the duplicate network packets are not forwarded on to their respective destinations. For example, after the network device processes the duplicate network packets using the secondary processing pipeline, and outputs any results, the duplicate network packets can be discarded without forwarding them to the next-hop network device or final destination.

In some implementations, at 550 any source devices that sent duplicate network packets with CRC errors are identified based on the CRC checks. The identification depicted at 550 could be performed by the network device that performs the operations depicted at 510-540, and/or by another device (e.g., by a monitoring service). For example, the source devices can be identified by their source IP addresses. Results of the CRC checks can also be output.

Figure 6:
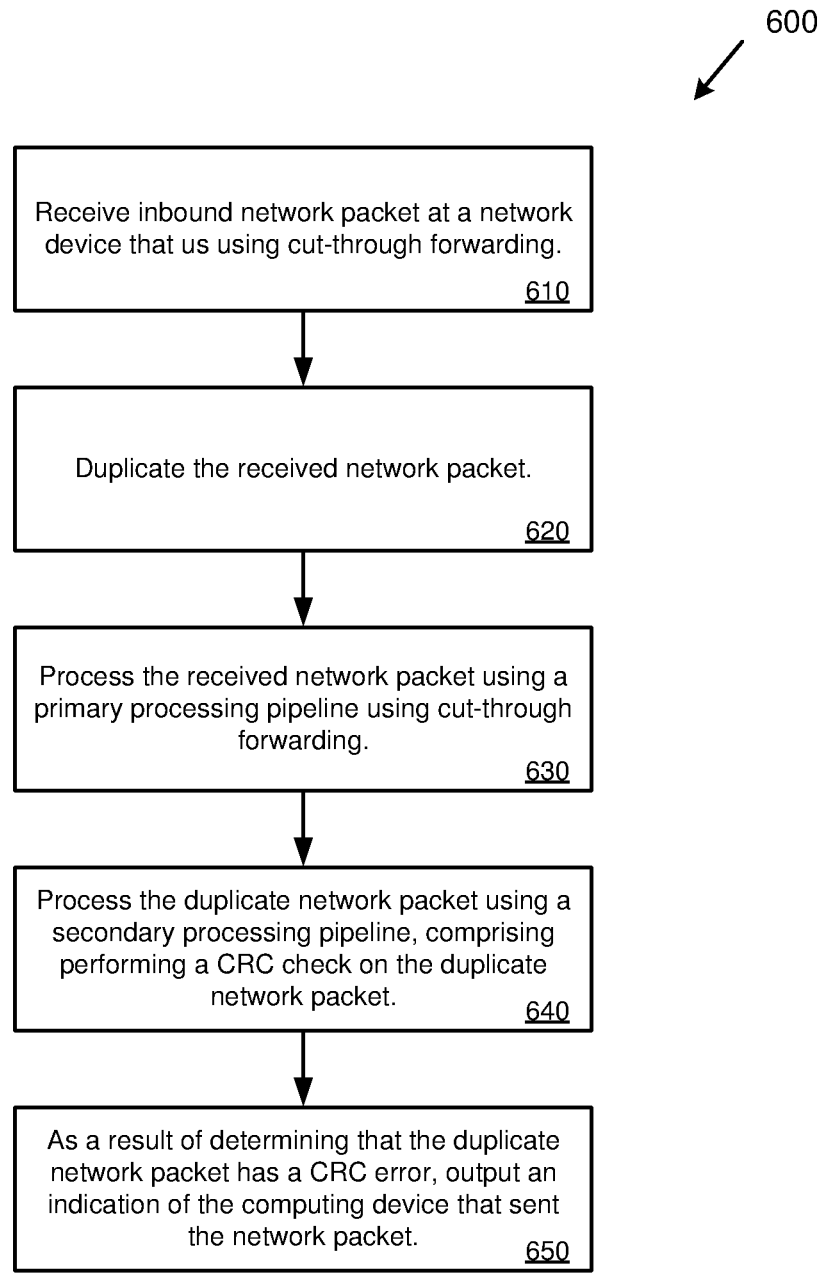
FIG. 6 is a flowchart of an example method for identifying the source of CRC errors with a computer network.

FIG. 6 is a flow chart of an example method 600 for identifying the source of CRC errors with a computer network. For example, the example method 600 can be performed by a network device (e.g., by network device 320, 322, or 324), such as a router, switch, or other type of network device that processes incoming network packets using cut-through forwarding.

At 610, an inbound network packet is received at a network device that is using cut-through forwarding. At 620, the received network packets is duplicated. At 630, the received network packet is processed using a primary processing pipeline using cut-through forwarding. In some implementations, the primary processing pipeline is the cut-through forwarding pipeline 120.

At 640, the duplicate network packet is processed using a secondary processing pipeline, comprising performing a CRC check on the duplicate network packet to detect whether the duplicate network packet has a CRC error (e.g., as a partial store-and-forward processing pipeline). In some implementations, the secondary processing pipeline performs only the CRC check. In some implementations, the duplicate network packet is not forwarded on to its destination. For example, after the network device processes the duplicate network packet using the secondary processing pipeline, and outputs any results, the duplicate network packet can be discarded without forwarding it to the next-hop network device or final destination.

At 650, as a result of determining that the duplicate network packet has a CRC error, an indication of the computing device that sent the network packet is output. For example, the source devices can be identified by its source IP address.

The example method 600 can be performed for any number of inbound network packets received by the network device. For example, at least some number of the inbound network packets received by the network device can be duplicated and checked for CRC errors using the secondary processing pipeline.

Figure 7:
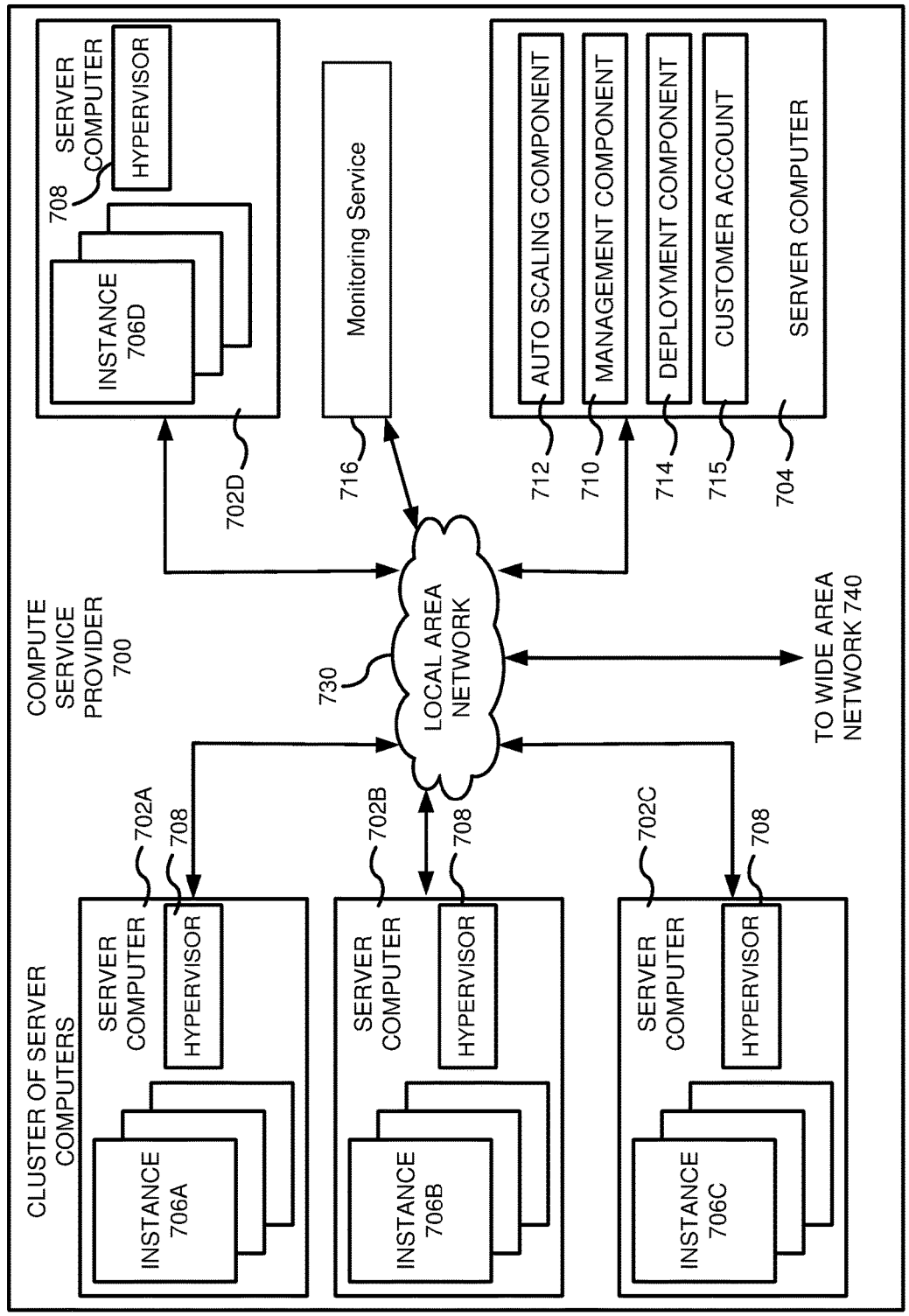
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise Clos networks or other types of multi-tiered network fabrics. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, a monitoring service 716 performs operations for identifying the source of CRC errors within the computer network (e.g., within the local area network 730, which can include various types of networks and network fabrics) of the compute service provider 700. For example, the monitoring service 716 can receive alerts or log information from the network devices that indicates identities of source devices sending CRC errors. The network devices (e.g., within the local area network 730 and/or the wide area network 740 that uses cut-through forwarding) can perform operations to duplicate network packets, process duplicate network packets using a secondary processing pipeline (including performing CRC checks), and send results to the monitoring service 716.

Figure 8:
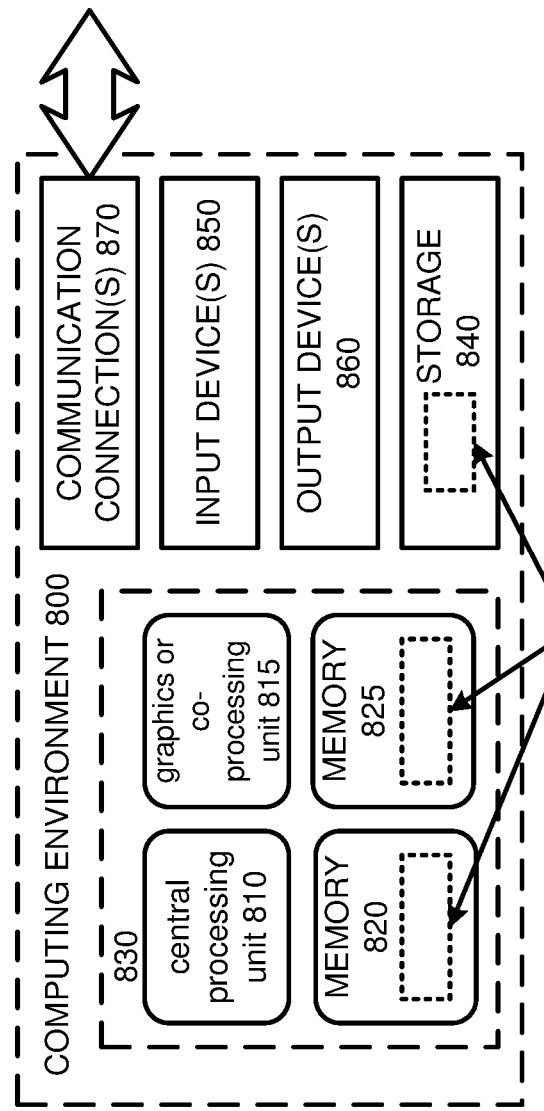
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more hardware processing units 810, 815 (also called hardware processors) and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of hardware processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), nonvolatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media and executed on a computer (e.g., any commercially available computer, including smart phones or other mobile devices that include computing hardware). Computer-readable storage media are tangible media that can be accessed within a computing environment (one or more optical media discs such as DVD or CD, volatile memory (such as DRAM or SRAM), or non-volatile memory (such as flash memory or hard drives)). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components (also called hardware logic devices or integrated circuits), instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A method for identifying a source of cyclic redundancy check (CRC) errors in network packets, the method comprising:
    receiving inbound network packets at network ports of a network device, wherein the network device is using cut-through forwarding on the network ports of the network device;
    duplicating at least some of the received network packets to create duplicate network packets;
    processing the received network packets using cut-through forwarding;
    processing the duplicate network packets by performing CRC checks on the duplicate network packets to detect CRC errors in the duplicate network packets;
    based on the CRC checks, identifying source devices that originated duplicate network packets with CRC errors, wherein identities of the source devices comprise source Internet Protocol (IP) addresses of the source devices; and
    outputting the identities of the source devices;
    wherein the duplicate network packets are not forwarded to their respective destinations.

2. The method of claim 1, wherein outputting the identities of the source devices comprises:
    sending an alert indicating the identities of the source devices; or
    providing results of the CRC checks to a logging system.

3. The method of claim 1, further comprising:
    based on determining that the CRC errors are detected on a subset of the network ports, increasing a proportion of inbound network packets from the subset of network ports that are duplicated and checked for CRC errors.

4. The method of claim 1, wherein the duplicate network packets are processed using a partial store-and-forward processing pipeline that only performs CRC checks and does not forward the duplicate network packets.

5. A network device comprising:
    processing units; and
    network ports;
    wherein the network device performs operations, the operations comprising:
        receiving inbound network packets at the network ports of the network device, wherein the network device uses cut-through forwarding on the network ports;
        duplicating at least some of the received network packets to create duplicate network packets;
        processing the received network packets using cut-through forwarding;
        processing the duplicate network packets using a secondary processing pipeline that performs cyclic redundancy check (CRC) checks on the duplicate network packets to detect CRC errors in the duplicate network packets; and
        identifying source devices that sent network packets with CRC errors based on the CRC checks, wherein identities of the source devices comprise Internet Protocol (IP) addresses of the source devices;

wherein the duplicate network packets, that are processed using the secondary processing pipeline, are not forwarded to their respective destinations indicated in the duplicate network packets.

6. The network device of claim 5, the operations further comprising:

sending an alert comprising the identities of the source devices that originated network packets with CRC errors.

7. The network device of claim 5, the operations further comprising:

providing the identities of the source devices, to a logging system.

8. The network device of claim 5, the operations further comprising:

saving simple network management protocol (SNMP) objects indicating the identities of the source devices that originated network packets with CRC errors.

9. The network device of claim 5, wherein the network device comprises:

one or more application specific integrated circuits (ASICs) that process the received network packets using cut-through forwarding, duplicate at least some of the received network packets, and processing the duplicate network packets using the secondary processing pipeline; and one or more central processing units (CPUs) that identify the source devices.

10. The network device of claim 5, the operations further comprising:

based on a determination that the CRC errors are detected on a specific network port, increasing a proportion of inbound network packets from the specific network port that are duplicated and checked for CRC errors.

11. The network device of claim 5, wherein network packets are duplicated for first and second network ports of the network device, and wherein rates of duplication for the first and second network ports vary based on available processing resources of the network device.

12. A method comprising:

receiving an inbound network packet at a network port of a network device, wherein the network device uses cut-through forwarding on network ports of the network device;

duplicating the received network packet to create a duplicate network packet;

processing the received network packet in a primary processing pipeline using cut-through forwarding;

processing the duplicate network packet using a secondary processing pipeline in the network device that performs a cyclic redundancy check (CRC) check on the duplicate network packet to determine whether the duplicate network packet has a CRC error, wherein the duplicate network packet is not forwarded to a destination indicated in the duplicate network packet;

as a result of determining that the duplicate network packet has a CRC error, outputting an indication of a computing device that sent the duplicate network packet, wherein the computing device that sent the duplicate network packet is identified, at least in part, by an Internet Protocol (IP) address of the computing device.

13. The method of claim 12, wherein outputting the indication of the computing device that sent the duplicate network packet comprises:

sending an alert comprising an identity of the computing device.

14. The method of claim 12, further comprising:

receiving additional inbound network packets at the network port;

processing the received additional inbound network packets using cut-through forwarding;

duplicating at least some of the received additional network packets to create additional duplicate network packets;

processing the duplicate network packet using the secondary processing pipeline that performs CRC checks on the duplicate network packets to determine whether the duplicate network packets have CRC errors, wherein the additional duplicate network packets, that are processed using the secondary processing pipeline, are not forwarded to their respective destinations.

15. The method of claim 12, further comprising:

determining that a specific computing device is originating network packets with CRC errors at a rate that exceeds an error threshold; and based on the determination, excluding network packets received from the specific computing device from being duplicated and processed using the secondary processing pipeline.

16. The method of claim 12, further comprising:

determining that a specific computing device is originating network packets with CRC errors at a rate that exceeds an error threshold; and based on the determination, blocking network packets received from the specific computing device from being processed by the network device.

17. An integrated circuit comprising:

a cut-through forwarding pipeline that performs operations comprising:

receiving inbound network packets at network ports of a network device; and processing the received network packets using cut-through forwarding;

a duplication circuit that duplicates at least some of the received network packets to create duplicate network packets;

a secondary processing pipeline that performs operations comprising:

performing cyclic redundancy check (CRC) checks on the duplicate network packets to detect CRC errors;

wherein the duplicate network packets, that are processed using the secondary processing pipeline, are not forwarded to their respective destinations indicated in the duplicate network packets; and wherein source devices that send network packets with CRC errors are identified based on the CRC checks, and wherein the source devices are identified, at least in part, by Internet Protocol (IP) addresses of the source devices.

* * * * *